(12) United States Patent
Zhang

(10) Patent No.: US 12,513,579 B2
(45) Date of Patent: Dec. 30, 2025

(54) COMMUNICATION CONNECTION RESUMING METHOD, BASE STATION AND COMPUTER-READABLE STORAGE MEDIUM

(71) Applicant: ZTE CORPORATION, Shenzhen (CN)

(72) Inventor: Haixia Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 425 days.

(21) Appl. No.: 18/262,960

(22) PCT Filed: Jan. 6, 2022

(86) PCT No.: PCT/CN2022/070574
§ 371 (c)(1),
(2) Date: Jul. 26, 2023

(87) PCT Pub. No.: WO2022/257448
PCT Pub. Date: Dec. 15, 2022

(65) Prior Publication Data
US 2024/0089811 A1  Mar. 14, 2024

(30) Foreign Application Priority Data
Jun. 9, 2021 (CN) .......................... 202110642647.4

(51) Int. Cl.
*H04W 36/00* (2009.01)
(52) U.S. Cl.
CPC ... *H04W 36/0069* (2018.08); *H04W 36/0072* (2013.01)
(58) Field of Classification Search
CPC ......... H04W 36/0069; H04W 36/0072; H04W 24/02; H04W 36/0033; H04W 76/15; H04W 76/27; H04W 76/19
See application file for complete search history.

(56) References Cited

U.S. PATENT DOCUMENTS

| 11,576,101 B2 * | 2/2023 | Yang ................. H04W 36/0058 |
| 2018/0270809 A1 * | 9/2018 | Park ..................... H04W 24/02 |

(Continued)

FOREIGN PATENT DOCUMENTS

| CN | 109548172 A | 3/2019 |
| CN | 111565424 A | 8/2020 |
| CN | 111586766 A | 8/2020 |

OTHER PUBLICATIONS

Prasad, Anand R., Sivabalan Arumugam, and Alf Zugenmaier. "3GPP 5G security." Journal of ICT Standardization 6.1-2 (2018): 137-158. (Year: 2018).*

(Continued)

*Primary Examiner* — Sharad Rampuria
(74) *Attorney, Agent, or Firm* — Vivacqua Crane, PLLC

(57) ABSTRACT

A communication connection resuming method, a base station and a computer-readable storage medium are disclosed. The method may include, sending a UE information acquisition request to the source MN, in response to a reception of a radio resource control (RRC) Resume request sent by the UE; acquiring RRC configuration information of the source SN fed back by the source MN; determining a target SN, and sending RRC configuration information to the target SN, to instruct the target SN to complete a configuration according to the RRC configuration information; and resuming a dual-connectivity communication of the UE in cooperation with the target SN with the configuration completed.

17 Claims, 8 Drawing Sheets

```
Acquire the RRC configuration information of      ─ S710
the source SN, in response to a reception of
the UE information acquisition request sent
by the target MN, where the UE information
acquisition request is sent by the target MN
according to the RRC Resume request from
              the UE
                    │
                    ▼
Send the RRC configuration information to         ─ S720
the target MN, so as to cause the target MN
to send the RRC configuration information to
the determined target SN for configuration,
      so as to resume the dual-connection
communication of the UE in cooperation with
the target SN with configuration completed
```

(56) References Cited

U.S. PATENT DOCUMENTS

2019/0037458 A1* 1/2019 Kadiri .................. H04W 76/20
2020/0396675 A1 12/2020 Liu et al.

OTHER PUBLICATIONS

3GPP Technical Specification Group Radio Access Network. "Change Request: SN resume during the RRCResume procedure," R3-197225, 3GPP TSG-RAN3 Meeting #109, Nov. 2019, pp. 1-6.
3GPP Technical Specification Group Radio Access Network. "Evolved Universal Terrestrial Radio (E-UTRA) and NR; Multi-connectivity; Stage 2 (Release 16)," 3GPP TS 37.340, v. 16.5.0, 2021.
3GPP Technical Specification Group Radio Access Network. "Evolved Universal Terrestrial Radio Access Network (E-UTRAN); X2 application protocol (X2AP) (Release 16)," 3GPP TS 36.423, v. 16.5.0, 2021.
European Patent Office. Extended European Search Report for EP Application No. 22819057.5, mailed Jul. 23, 2024, pp. 1-11.
International Searching Authority. International Search Report and Written Opinion for PCT Application No. PCT/CN2022/070574 and English translation, mailed Mar. 29, 2022, pp. 1-10.

* cited by examiner

Send RRC Resume information to the UE, in response to the reception of the configuration completion information sent by the target SN, so as to cause the UE to establish a connection with the target MN and the target SN respectively, thereby resuming the dual-connection communication — S410

FIG. 4

Report the transmission channel identification information to the mobility management functional entity (AMF), the transmission channel identification information includes the identification information of the transmission channels of both the target MN and the target SN — S510

Determine the transmission channel corresponding to the new transmission channel identification information as the transmission channel of the target SN, in response to an acquisition of the new transmission channel identification information for the target SN fed back by the AMF — S520

FIG. 5

Send a UE information release request to the source MN, to cause the source MN to release the local context information for the UE, and to trigger the source SN to release the instance for the UE — S610

FIG. 6

Acquire the RRC configuration information of the source SN, in response to a reception of the UE information acquisition request sent by the target MN, where the UE information acquisition request is sent by the target MN according to the RRC Resume request from the UE — S710

Send the RRC configuration information to the target MN, so as to cause the target MN to send the RRC configuration information to the determined target SN for configuration, so as to resume the dual-connection communication of the UE in cooperation with the target SN with configuration completed — S720

FIG. 7

COMMUNICATION CONNECTION RESUMING METHOD, BASE STATION AND COMPUTER-READABLE STORAGE MEDIUM

CROSS-REFERENCE TO RELATED APPLICATION

This application is a national stage filing under 35 U.S.C. § 371 of international application number PCT/CN2022/070574, filed Jan. 6, 2022, which claims priority to Chinese patent application No. 202110642647.4 filed Jun. 9, 2021. The contents of these applications are incorporated herein by reference in their entirety.

TECHNICAL FIELD

The present disclosure is directed to but is not limited to the technical field of communication, in particular to a method for resuming a communicational connection, a base station, and a computer-readable storage medium.

BACKGROUND

In 5th Generation (5G) communication systems, New Radio (NR) and NR-NR Dual-connectivity (NR-DC) are enabled for User Equipments (UEs). In the NR-DC mode, a UE can establish a communicational connection with two base stations simultaneously, with one base station serving as a master node (MN), and the other base station serving as a secondary node (SN). When the UE is moved to the coverage area of other base stations, the UE needs to select a new base station as the MN and trigger a cross-site resume process.

According to the cross-site resume communication procedure specified in some relevant standards, after disconnecting from the source MN, a UE sends a Resume request to the target MN. Then the target MN acquires the context information of the UE from the source MN to complete the configuration. The source MN releases the SN instance which is in an inactive state. The target MN needs to reconfigure the target SN, such that dual connectivity is established with the UE through the target MN and the target SN. However, the reconfiguration of the target SN is time-consuming. Before the target SN is configured, it is not possible for the UE to achieve dual-connectivity communication in the target MN, which leads to lower throughput and poor user experience.

SUMMARY

The following is a summary of the subject matter described herein. This summary is not intended to limit the scope of protection of the claims.

Provided are a method for resuming a communicational connection, a base station, and a computer-readable storage medium in some embodiments of the present disclosure.

An embodiment of the present disclosure provides a method for resuming a communicational connection, which is applied to a target master node (MN), where, the target MN is in communicational connection with a user equipment (UE), the target MN is in communicational connection with a source MN of the UE, the source MN is an MN of a source site of the UE, and the source site of the UE further includes a source secondary node (SN), and the source SN is in an inactive state, the method may include, sending a UE information acquisition request to the source MN, in response to a reception of a radio resource control (RRC) Resume request sent by the UE; acquiring RRC configuration information from the source SN fed back by the source MN; determining a target SN, and sending the RRC configuration information to the target SN, to instruct the target SN to complete a configuration according to the RRC configuration information; and resuming a dual-connectivity communication of the UE in cooperation with the target SN with the configuration completed.

An embodiment of the present disclosure provides a method for resuming a communicational connection, which is applied to a source master node (MN), where the source MN is in communicational connection with a target MN of a user equipment (UE), the source MN is an MN of source site of the UE, and the source site of the UE further includes a source secondary node (SN), and the source SN is in an inactive state, the method may include, acquiring RRC configuration information of the source SN, in response to a reception of a UE information acquisition request sent by a target MN, where, the UE information acquisition request is sent by the target MN according to the RRC Resume request from the UE; and sending the RRC configuration information to the target MN, to instruct the target MN to send the RRC configuration information to a determined target SN for configuration, so as to resume a dual-connectivity communication of the UE in cooperation with the target SN with the configuration completed.

An embodiment of the present disclosure provides a base station, which may include a memory, a processor, and a computer program stored in the memory and executable by the processor which, when executed by the processor causes the processor to carry out any one of the methods as described above.

An embodiment of the present disclosure further provides a computer-readable storage medium storing thereon a computer-executable instruction which, when executed by a processor, causes the processor to carry out any one of the methods as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

FIG. 4 depicts a flow chart showing the operations for resuming the dual-connectivity communication of the UE in cooperation with the target SN according to another embodiment of the present disclosure;

FIG. 5 depicts a flowchart showing the operations for determining the transmission channel of the target SN according to another embodiment of the present disclosure;

FIG. 6 depicts a flowchart showing the operations for releasing the source SN according to another embodiment of the present disclosure;

FIG. 7 depicts a flowchart showing a method for resuming a communicational connection according to another embodiment of the present disclosure;

DETAILED DESCRIPTION

The purpose, technical scheme and advantages of the present disclosure will become apparent through the following description for various embodiments in conjunction with the drawings. It should be understood that the embodiments described here are intended for illustration but not limitation to the present disclosure.

It should be noted that although the devices are shown with individual functional modules in the schematic diagram and the logical sequences are shown in the flow chart, in some cases, the devices can have different modules than those shown and the steps can be executed in a different order than those shown. The terms "first" and "second", if used in the description, claims and the drawings are intended to distinguish similar objects, and do not necessarily imply any specific order or sequence.

Provided are a method for resuming a communicational connection, a base station, and a computer-readable storage medium in some embodiments of the present disclosure. The method for resuming a communicational connection is applied to a target master node (MN), where the target MN is in communicational connection with a user equipment (UE), the target MN is in communicational connection with a source MN of the UE, the source MN is an MN of a source site of the UE, and the source site of the UE further includes a source secondary node (SN), and the source SN is in an inactive state. The method includes, sending a UE information acquisition request to the source MN, in response to a reception of a radio resource control (RRC) Resume request sent by the UE; acquiring RRC configuration information of the source SN fed back by the source MN; determining a target SN, and sending the RRC configuration information to the target SN, to instruct the target SN to complete a configuration according to the RRC configuration information; and resuming a dual-connectivity communication of the UE in cooperation with the target SN with the configuration completed. According to the scheme provided by the embodiment of the present disclosure, the SN configuration efficiency of the cross-site resume procedure can be effectively improved, and the influence of the cross-site procedure on throughput can be reduced.

Some embodiments of the present disclosure will be further illustrated with reference to the drawings.

Figure 1:
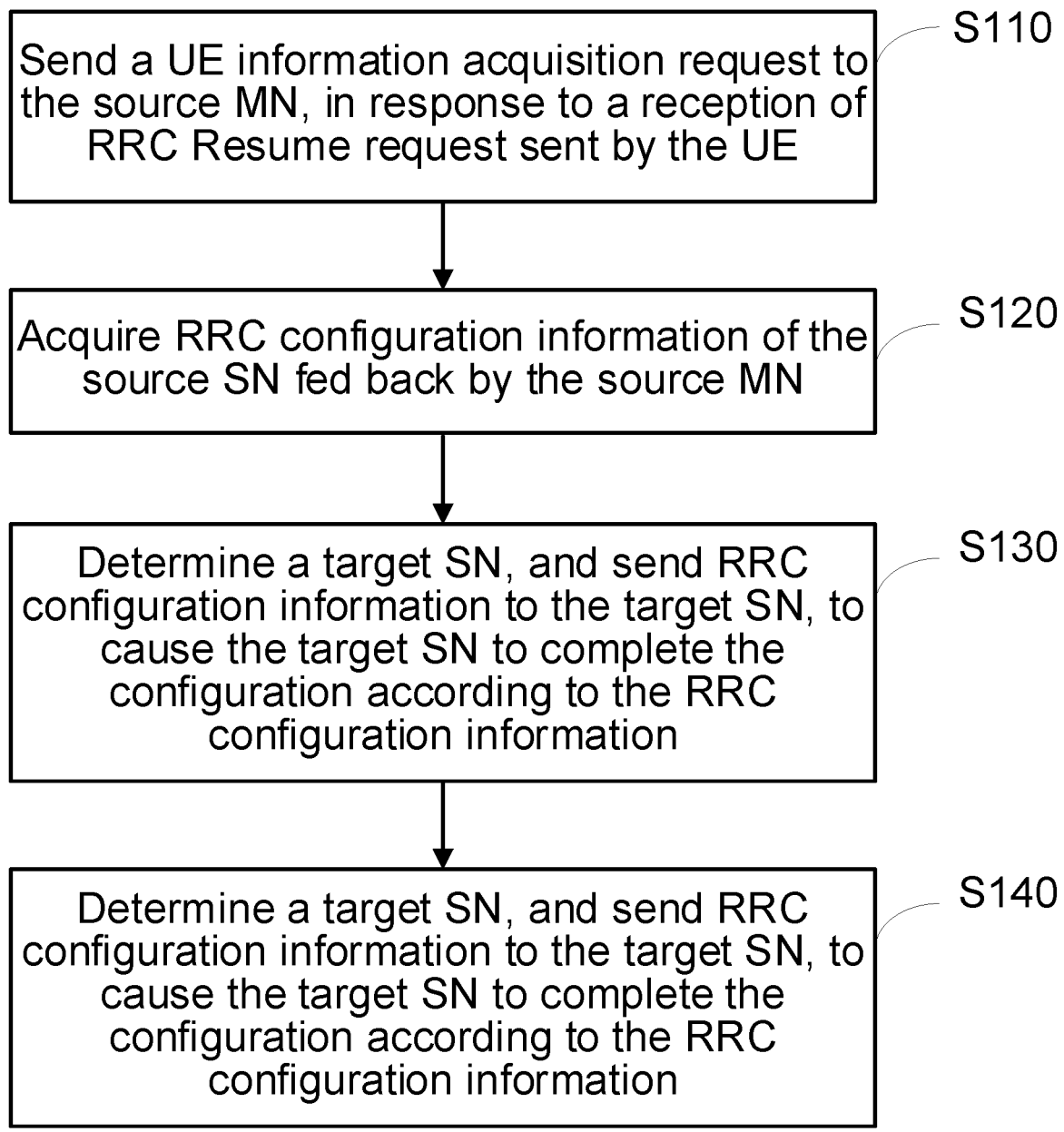
FIG. 1 depicts a flowchart showing a method for resuming a communicational connection according to an embodiment of the present disclosure.

FIG. 1 depicts a flow chart showing the operations of a method for resuming a communicational connection according to an embodiment of the present disclosure. The method is applied to a target master node (MN). The MN is in a communicational connection with a user equipment (UE), and is in a communicational connection with a source MN of the UE. The source MN is an MN of a source site of the UE, and the source site of the UE further includes a source secondary node (SN). The source SN is in an inactive state. The method includes but is not limited to the following operations.

At S110, a UE information acquisition request is sent to the source MN, in response to a reception of a radio resource control (RRC) Resume request sent by the UE.

It can be understood that, when the UE transitions from the RRC inactive state to the RRC connected state after being moved to a coverage area of a new base station, the UE sends an RRC Resume request to the target MN, requesting to establish a connection with the target MN. It should be noted that in an embodiment, the RRC Resume request is well known to those having ordinary skills in the art. The type of parameter can be adjusted according to practical situations, and which is not limited in this embodiment.

It can be understood that when the target MN receives the RRC Resume request from the UE, the target MN responds to the RRC Resume request and sends a UE information acquisition request to the source MN to acquire the context information of the UE from the source MN. Based on this context information, the RRC connection of the UE in the target MN can be achieved.

At S120, RRC configuration information of the source SN fed back by the source MN is acquired.

It can be understood that the communicational connection to be resumed is the dual-connectivity communication of the UE, so the UE needs to establish a communication connection not only with the target MN, but also with the target SN. After the target MN sends the UE information acquisition request to the source MN, the source MN responds to the UE information acquisition request and feeds back the RRC configuration information from the source SN. Based on the RRC configuration information from the source SN, UE dual-connectivity communication can be resumed.

It should be noted that it is not intended to limit the RRC configuration information in various embodiments of the present disclosure. The type of parameter can be adjusted according to practical situations, and which is not limited in this embodiment.

At S130, a target SN is determined, and the RRC configuration information is sent to the target SN, to instruct the target SN to complete the configuration according to the RRC configuration information.

It can be understood that the determination of the target SN to which the RRC configuration information is sent, allows the target SN to establish a communicational connection with the UE according to the RRC configuration information.

At S140, a dual-connectivity communication of the UE is resumed in cooperation with the target SN of which the configuration has been completed.

It can be understood that, in the process of cross-site communication resume of the UE, after the target MN and the UE are configured with each other, the target MN cooperates with the configured target SN. That is, the target MN establishes a communicational connection with the UE, and cooperates with the target SN that is in a communicational connection with the UE to resume the dual-connectivity communication of the UE. According to the related standards, after disconnecting from the source MN, a UE sends an RRC Resume request to the target MN. After the target MN obtains the context information of the UE from the source MN to complete the configuration, the target MN triggers the source MN to release the SN instance that is in the inactive state, which causes a time-consuming reconfiguration of the SN by the target MN. Before the configuration of the target SN is completed, it is not possible for the UE to achieve dual-connectivity communication in the target MN, which leads to lower throughput and poor user experience. In contrast, the scheme provided by various embodiments of the present disclosure can effectively improve the SN configuration efficiency of the cross-site resume procedure and reduce the influence of the cross-site resume procedure on throughput.

Figure 2:
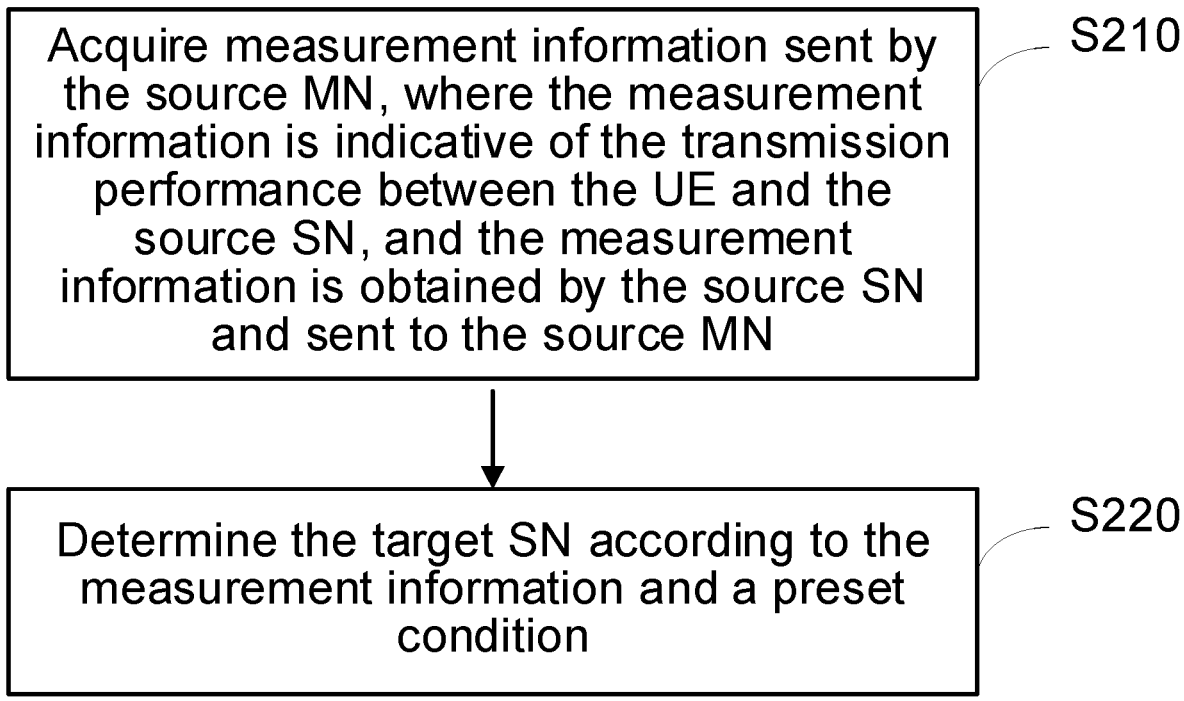
FIG. 2 depicts a flowchart showing operations for determining a target SN according to another embodiment of the present disclosure.

Referring to FIG. 2, in an embodiment, S130 in the embodiment shown in conjunction with FIG. 1 further includes, but is not limited to, the following operations.

At S210, measurement information sent by the source MN is acquired, where the measurement information is indicative of the transmission performance between the UE and the source SN, and the measurement information is obtained by the source SN and sent to the source MN.

At S220, the target SN is determined according to the measurement information and a preset condition.

It can be understood that the measurement information serves as reference information for determining the target SN. In an embodiment of the present disclosure, the measurement information can be any information like, signal strength information, resource utilization information or channel utilization information, as long as it is indicative of the transmission performance between the UE and the source SN, and which is not limited here.

It should be noted that it is not intended to limit the order of the acquisition of the measurement information and RRC configuration information in various embodiments of the present disclosure. For example, the source MN may send a signaling to the target MN, which carries both measurement information and RRC configuration information. Alternatively, the source MN may send measurement information and RRC configuration information respectively in response to different requests of the target MN. Those having ordinary skills in the art can conceive how the information is carried according to practical situations, and which is not limited in this embodiment.

It is worth noting that during the handover of the MN, the UE may be out of the coverage area of the source SN, or may be still within the coverage area of the source SN. And thus, the SN that cooperates with the MN to complete the dual-connectivity communication is not necessarily a new SN. Since the measurement information is indicative of the transmission performance between the UE and the source SN, based on this, a preset condition can be preset. The source SN can be determined as the target SN, or a new SN can be selected from the neighboring base stations of the MN, according to the matching of the measurement information and the preset condition. It should be noted that, those having ordinary skills in the art can set specific preset conditions according to the practical situation of the cell, and can determine whether to keep the source SN according to the measurement information, and which is not limited in this embodiment.

It can be understood that the preset conditions serve as the basis for the determination with the measurement information, and different types of measurement information correspond to different preset conditions. The target SN is determined through the preset conditions in conjunction with measurement information.

Figure 3:
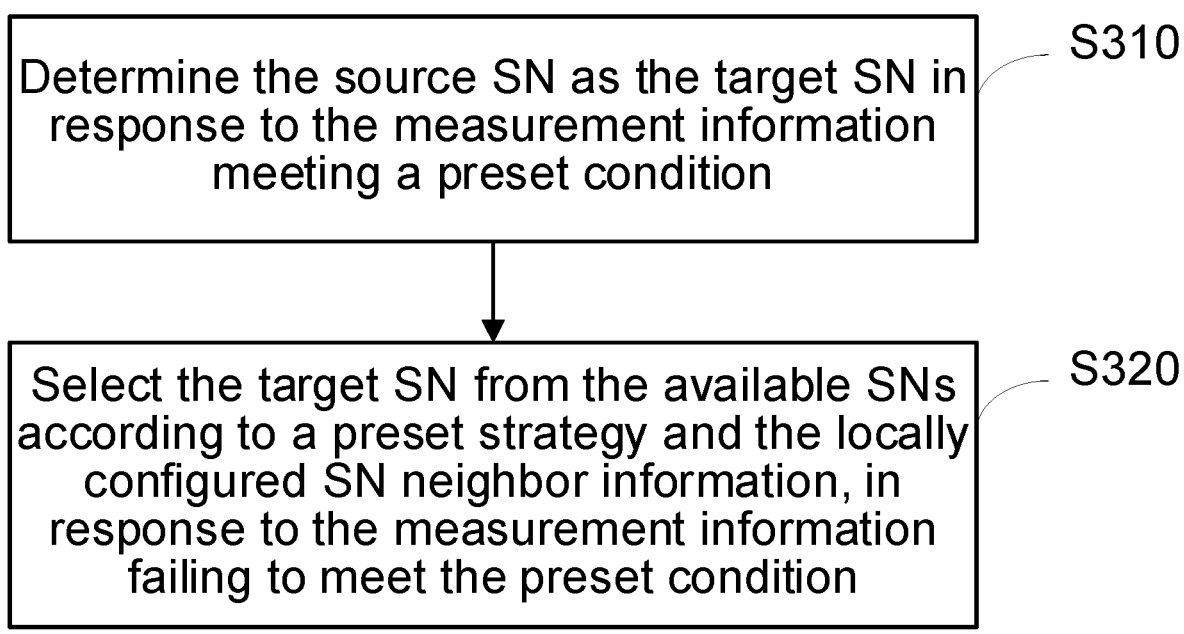
FIG. 3 depicts a flowchart showing operations for determining a target SN according to another embodiment of the present disclosure.

Referring to FIG. 3, in an embodiment, S220 in the embodiment shown in conjunction with FIG. 2 further includes, but is not limited to, the following operations.

At S310, the source SN is determined as the target SN in response to the measurement information meeting a preset condition.

Alternatively, at S320, the target SN is selected from the available SNs according to a preset strategy and the locally configured SN neighbor information, in response to the measurement information failing to meet the preset condition.

It can be understood that since the preset conditions are set corresponding to the measurement information, and the measurement information has a variety of options, as long as the measurement information can be indicative of the transmission performance between the UE and the source SN. Those having ordinary skills in the art have the motivation to set different preset conditions according to different types of measurement information, so that the measurement information can be compared with the preset conditions. For example, when the measurement information is signal strength information, the preset conditions can be the threshold of the signal strength information. The threshold indicates the lowest signal strength of the SN that allows the UE to establish a dual-connectivity communication in the target site. When the measurement information meets the preset condition, e.g., the signal strength of the source SN is greater than or equal to the threshold, it indicates the transmission performance between the UE and the source SN is better, and the UE can realize the dual-connectivity communication with the source SN and the target MN. In this case, the source SN can be determined as the target SN. Similarly, when the measurement information does not meet the preset conditions, e.g., the signal strength of the source SN is less than the threshold, it indicates that the transmission performance between the UE and the source SN is poor. If the UE establishes a dual-connectivity communication with the source SN and the target MN, the communication quality will be poor. In order to ensure that the communication quality can meet the user's demands, the target MN can re-select a new target SN according to the preset strategy and the locally configured SN neighbor information to resume the dual-connectivity communication.

It should be noted that for each base station, the information of neighboring base stations is known. For example, based on the local configuration information of the target MN, the base station information of SN that can be serves as the target SN, i.e., the SN neighbor information is determined. The available SNs are determined from the SN neighbor information. The available SNs are those SNs that can be served as the target SNs in neighboring base stations. Then the target SN can be selected from the available SNs according to the preset strategy.

It is worth noting that those having ordinary skills in the art have the motivation to determine the preset strategy according to the practical situation. For example, in the case of sufficient resources, the preset strategy can be to select the candidate SN with the best communication quality as the target SN. In the case of heavy cell load, the preset strategy can be to select the candidate SN with more available resources as the target SN. It is not intended to limit the method for the selection of the preset strategy in this embodiment. Any suitable method is possible so long as the target SN can be determined from the candidate SNs.

Referring to FIG. 4, in an embodiment, S140 in the embodiment shown in conjunction with FIG. 1 further includes, but is not limited to, the following operations.

At S410, RRC Resume information is sent to the UE, in response to the reception of the configuration completion information sent by the target SN, so as to instruct the UE to establish a connection with the target MN and the target SN respectively, thereby resuming the dual-connectivity communication.

It can be understood that, when the target MN receives the configuration completion information sent by the target SN, it indicates that the target SN has completed the mutual configuration with the UE. The target MN sends RRC Resume information to the UE, so that the dual-connectivity communication of the UE can be resumed in cooperation with the target SN whose configuration has been completed.

Referring to FIG. 5, in an embodiment, before S140 described in the embodiment shown in FIG. 1, the method further includes but is not limited to the following operations.

At S510, the transmission channel identification information is reported to the mobility management functional entity (AMF), the transmission channel identification information includes the identification information of the transmission channels of both the target MN and the target SN.

At S520, the transmission channel corresponding to the new transmission channel identification information is determined as the transmission channel of the target SN, in response to an acquisition of the new transmission channel identification information for the target SN fed back by the AMF.

It can be understood by those having ordinary skills in the art that the transmission channel identification information may include UE data service channel node address information, etc., and which is not limited in this embodiment of the present disclosure. The target MN reports the transmission channel identification information to the AMF, so as to query the core network whether it is necessary to update the dual-connectivity transmission channel of the UE. When the AMF returns the new transmission channel identification information, the transmission channel corresponding to the new transmission channel identification information is determined as the transmission channel of the target SN. For example, in the case that the data transmission quality of the current transmission channel is poor, AMF returns better transmission channel information to the target MN, so that the UE can achieve better dual-connectivity communication.

Referring to FIG. 6, in an embodiment, before S140 described in the embodiment shown in FIG. 1, the method further includes but is not limited to the following operations.

At S610, a UE information release request is sent to the source MN, to instruct the source MN to release the local context information for the UE, and to trigger the source SN to release the instance for the UE.

It can be understood that when the UE completes the dual-connectivity communication configuration with the target MN and the target SN, the releasing of the context information for the UE in the source MN and triggering the release of the source SN can reduce the communication load of the source SN and release the memory of the network device.

FIG. 7 depicts a flowchart showing a method for resuming a communicational connection according to another embodiment of the present disclosure. The method is applied to a source MN. The source MN is in a communicational connection with a target MN of a user equipment (UE). The source MN is an MN of the source site of the UE, and the source site of the UE further includes a source SN. The source SN is in an inactive state. The method includes but is not limited to the following operations.

At S710, the RRC configuration information of the source SN is acquired, in response to a reception of the UE information acquisition request sent by the target MN, where the UE information acquisition request is sent by the target MN according to the RRC Resume request from the UE.

At S720, the RRC configuration information is sent to the target MN, so as to instruct the target MN to send the RRC configuration information to the determined target SN for configuration, so as to resume the dual-connectivity communication of the UE in cooperation with the target SN with the configuration completed.

It should be noted that the specific operations and methods can refer to the description of the embodiment described in FIG. 1, and which will not be repeated here. The difference between this embodiment and the embodiment described in FIG. 1 is that this embodiment is described with the source MN as the entity which performs the method.

Figure 8:
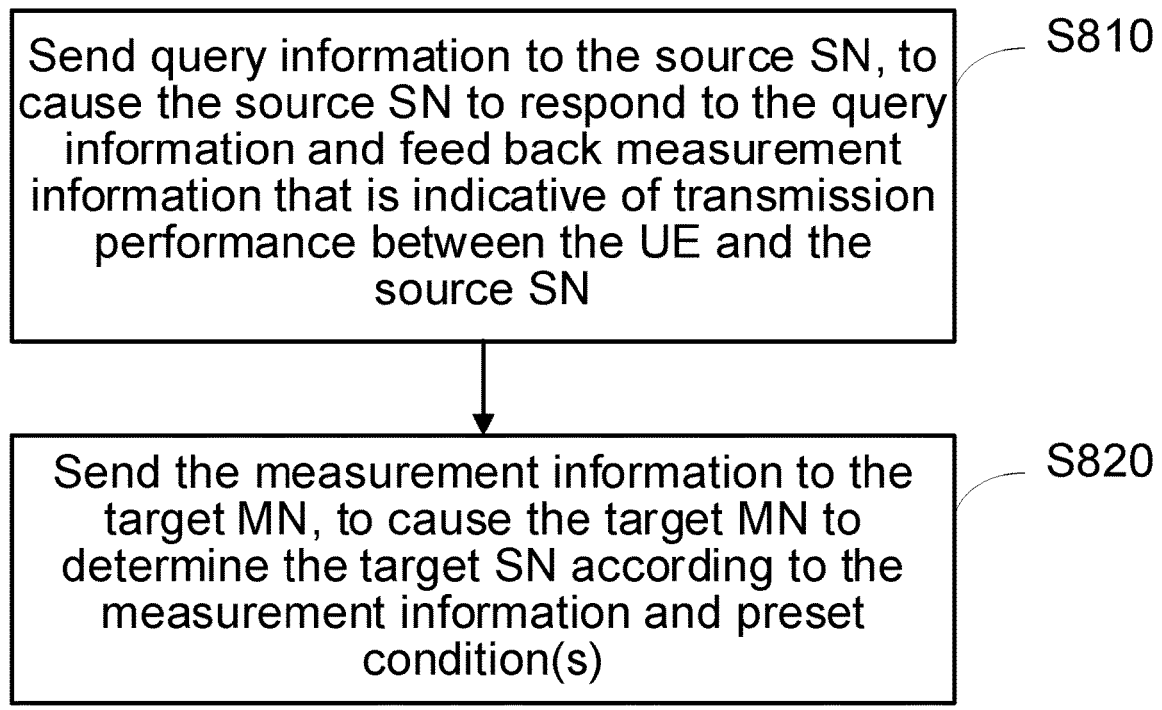
FIG. 8 depicts a flowchart showing operations for determining a target SN according to another embodiment of the present disclosure.

Referring to FIG. 8, in an embodiment, after S710 described in the embodiment shown in FIG. 7, the method further includes but is not limited to the following operations.

At S810, query information is sent to the source SN, to instruct the source SN to respond to the query information and feed back measurement information that is indicative of transmission performance between the UE and the source SN.

At S820, the measurement information is sent to the target MN, to instruct the target MN to determine the target SN according to the measurement information and preset condition(s).

It should be noted that the specific operations and methods can refer to the description of the embodiment described in FIG. 2, and which will not be repeated here. The difference between this embodiment and the embodiment described in FIG. 2 is that this embodiment is described with the source MN as the entity which performs the method.

Figure 9:
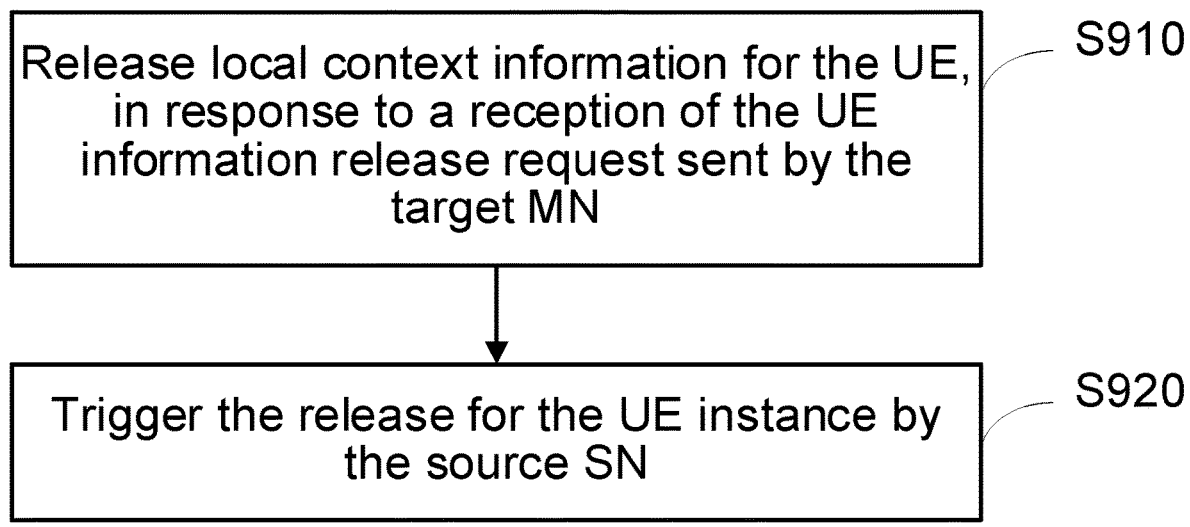
FIG. 9 depicts a flowchart showing the operations for releasing the source SN according to another embodiment of the present disclosure.

Referring to FIG. 9, in an embodiment, after S720 described in the embodiment shown in FIG. 7, the method further includes but is not limited to the following operations.

At S910, local context information for the UE is released, in response to a reception of the UE information release request sent by the target MN.

At S920, the release of an instance for the UE by the source SN is triggered.

It should be noted that the specific operations and methods can refer to the description of the embodiment described in FIG. 6, and which will not be repeated here. The difference between this embodiment and the embodiment described in FIG. 6 is that this embodiment is described with the source MN as the entity which performs the method.

The technical scheme of the present disclosure is illustrated below by way of two examples, for a better understanding of the method for resuming a communicational connection according to some embodiment of the present disclosure.

Figure 10:
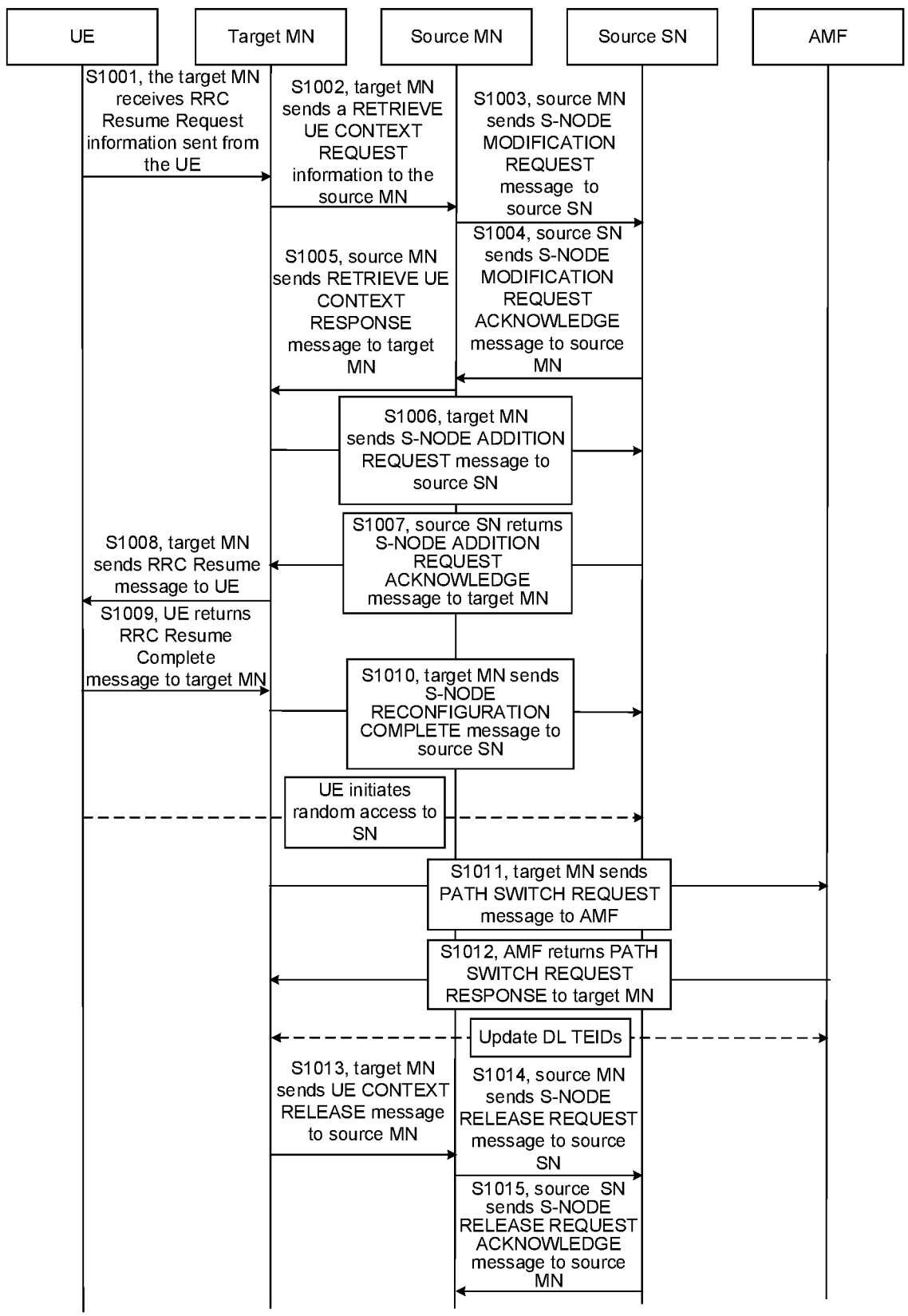
FIG. 10 depicts an illustrative flow chart showing the target MN cooperating with the source SN to resume the dual-connectivity communication of the UE according to another embodiment of the present disclosure.

Example Embodiment One: FIG. 10 depicts an illustrative flow chart showing the target MN cooperating with the source SN to resume the dual-connectivity communication of the UE according to another embodiment of the present disclosure. The process includes the following operations.

At S1001, the target MN receives RRC Resume Request information sent from the UE.

At S1002, after receiving the RRC Resume Request information from the UE, the target MN sends a RETRIEVE UE CONTEXT REQUEST message to the source MN to acquire the context information of the UE.

At S1003, after receiving the UE context request information, the source MN, if identifies an SN that is in an inactive state, sends to the source SN, an S-NODE MODIFICATION REQUEST message that carries an information element of SCG Configuration Query, to query the configuration information of the source SN.

At S1004, after receiving the query request, the source SN sends to the source MN, an S-NODE MODIFICATION REQUEST ACKNOWLEDGE message that carries the RRC configuration information of the source SN and measurement information of the local cell.

At S1005, the source MN sends to the target MN, a RETRIEVE UE CONTEXT RESPONSE message that carries an information element of HandoverPreparationInformation that includes sourcescg-NR-Config, that is, the source SN configuration information returned by the source SN.

At S1006, the target MN selects and adds the source SN according to the configuration information of the source SN, and sends to the source SN, an S-NODE ADDITION REQUEST message that carries CG-configInfo containing the source-scgConfig.

At S1007, the source SN performs local configuration according to the source-scgConfig, and returns an S-NODE ADDITION REQUEST ACKNOWLEDGE message to the target MN after the local configuration is completed.

At S1008, the target MN sends an RRC Resume message to the UE.

At S1009, after receiving the RRC Resume message, the UE performs configuration of the MN and initials random access to the SN, and returns an RRC Resume Complete message to the target MN when the random access is completed.

At S1010, after receiving the RRC Resume Complete message, the target MN sends S-NODE RECONFIGURATION COMPLETE message to the source SN.

S1011, the target MN sends to the AMF, a PATH SWITCH REQUEST message that carries tunnel endpoint identifiers (TEIDs) of Downlink (DL) of the target MN and the source SN.

At S1012, the AMF returns a PATH SWITCH REQUEST RESPONSE message to the target MN, and the PATH SWITCH REQUEST RESPONSE message, when containing new DL TEIDs, causes the target MN to trigger the SN Modification process to update uplink (UL) TEIDs.

At S1013, the target MN sends a UE CONTEXT RELEASE message to the source MN, to instruct the source MN to release the local UE context information.

At S1014, the source MN sends an S-NODE RELEASE REQUEST message to the source SN, to instruct the source SN to release the instance for the UE corresponding to the source MN.

At S1015, after releasing the instance for the UE corresponding to the source MN, the source SN sends an S-NODE RELEASE REQUEST ACKNOWLEDGE message to the source MN, and the UE transitions to the connected state from the inactive state, and the configuration of the SN is completed.

Figure 11:
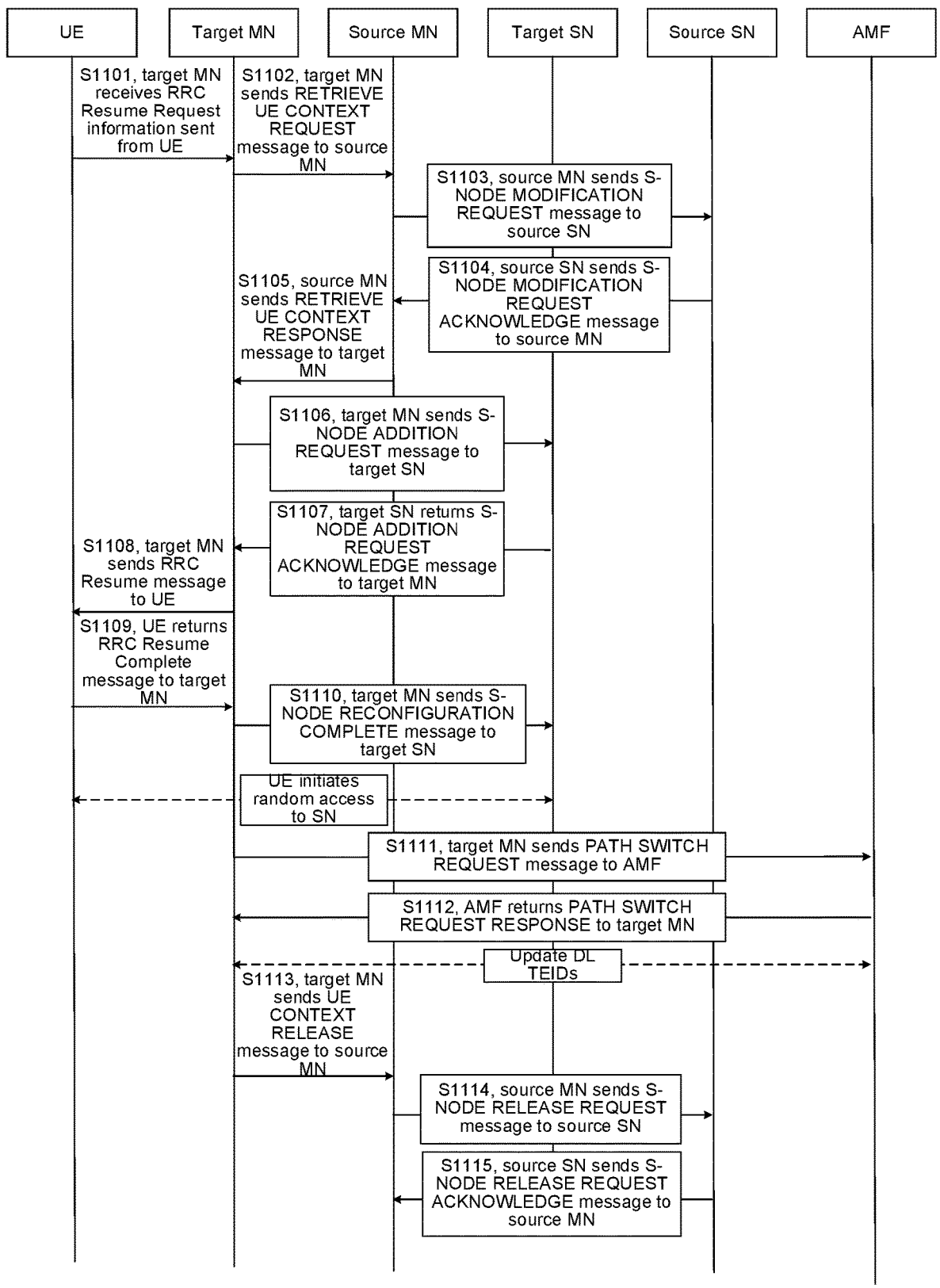
FIG. 11 depicts an illustrative flow chart showing the target MN cooperating with a non-source SN to resume the dual-connectivity communication of the UE according to another embodiment of the present disclosure.

Example Embodiment Two: FIG. 11 depicts an illustrative flow chart showing the target MN cooperating with a non-source SN to resume the dual-connectivity communication of the UE according to another embodiment of the present disclosure. The process includes the following operations.

At S1101, the target MN receives RRC Resume Request information sent from the UE.

At S1102, after receiving the RRC Resume Request information from the UE, the target MN sends a RETRIEVE UE CONTEXT REQUEST message to the source MN to acquire the context information of the UE.

At S1103, after receiving the UE context request information, the source MN, if identifies an SN that is in an inactive state, sends to the source SN, an S-NODE MODIFICATION REQUEST message that carries an information element of SCG Configuration Query, to query the configuration information of the source SN.

At S1104, after receiving the query request, the source SN sends to the source MN, an S-NODE MODIFICATION REQUEST ACKNOWLEDGE message that carries the RRC configuration information of the source SN and measurement information of the local cell.

At S1105, the source MN sends to the target MN, a RETRIEVE UE CONTEXT RESPONSE message that carries an information element of HandoverPreparationInformation that includes sourcescg-NR-Config, that is, the source SN configuration information returned by the source SN.

At S1106, the target MN selects the target SN from the available SNs according to the RRC configuration information returned by the source SN, the locally configured SN neighbor information and the local strategy, and sends an S-NODE ADDITION REQUEST message to the target SN, where the target SN and the source SN are distinct from each other, and the S-NODE ADDITION REQUEST carries CG-configInfo containing the source-scgConfig.

At S1107, the target SN performs local configuration according to the source-scgConfig, and returns an S-NODE ADDITION REQUEST ACKNOWLEDGE message to the target MN after the local configuration is completed.

At S1108, the target MN sends an RRC Resume message to the UE.

At S1109, after receiving the RRC Resume message, the UE configures the MN and initials random access to the SN, and returns an RRC Resume Complete message to the target MN when the random access is completed.

At S1110: after receiving the RRC Resume Complete message, the target MN sends S-NODE RECONFIGURATION COMPLETE to the target SN.

At S1111, the target MN sends to the AMF, a PATH SWITCH REQUEST message that carries the DL TEIDs of the target MN and the source SN.

At S1112, the AMF returns a PATH SWITCH REQUEST RESPONSE message to the target MN, and the PATH SWITCH REQUEST RESPONSE message, when containing new DL TEIDs, causes the target MN to trigger the SN Modification process to update UL TEIDs.

At S1113, the target MN sends a UE CONTEXT RELEASE message to the source MN, to instruct the source MN to release the local UE context information.

At S1114, the source MN sends an S-NODE RELEASE REQUEST message to the source SN, to instruct the source SN to release the instance for the UE corresponding to the source MN.

At S1115, after the source SN releases the instance for the UE corresponding to the source MN, an S-NODE RELEASE REQUEST ACKNOWLEDGE message is sent to the source MN, and the UE transitions to the connected state from the inactive state, and the configuration of the SN is completed.

Figure 12:
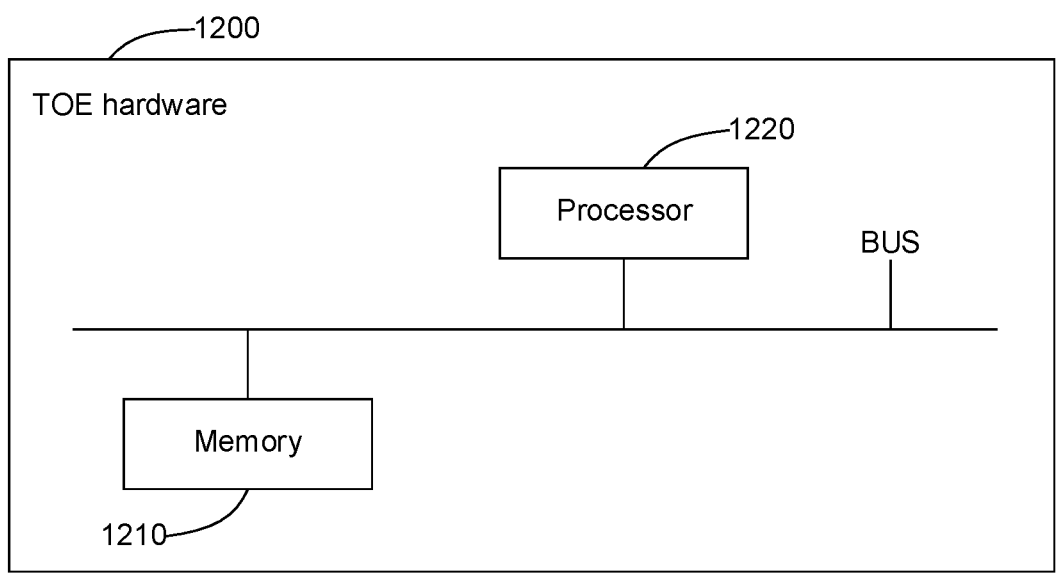
FIG. 12 depicts a schematic diagram showing a base station according to another embodiment of the present disclosure.

FIG. 12 depicts a schematic diagram showing a base station according to an embodiment of the present disclosure. An embodiment of the present disclosure further provides a base station 1200, which includes a memory 1210, a processor 1220, and a computer program stored in the memory 1210 and executable by the processor 1220.

The processor 1220 and the memory 1210 may be connected by a bus or other means.

Non-transitory software programs and instructions of the method described in the above embodiments are stored in memory 1210 which, when executed by processor 1220, cause the processor 1220 to carry out operations of the method described above, for example, the above-described operations S110 to S140 described in conjunction with FIGS. 1, S210 to S220 described in conjunction with FIGS. 2, S310 to S320 described in conjunction with FIG. 3, S410 described in conjunction with FIG. 4, S510 to S520 described in conjunction with FIG. 5, S610 described in conjunction with FIG. 6, or S710 to S720 described in conjunction with FIG. 7, S810 to S820 described in conjunction with FIGS. 8, S910 to S920 described in conjunction with FIG. 9.

The above-described device embodiments are only illustrative, in which the units illustrated as separate components may or may not be physically separated, that is, they may be located in one place or distributed over several network units. Some or all of the modules can be selected according to the practical needs to achieve the purpose of this embodiment.

In addition, an embodiment of the present disclosure further provides a computer-readable storage medium, which stores computer-executable instructions which, when executed by processor 1220 or a controller, for example, by a processor 1220 in the embodiment of the base station 1200, causes the processor 1220 to carry out the operations of the method described above, for example, the above-described operations S110 to S140 described in conjunction with FIGS. 1, S210 to S220 described in conjunction with FIGS. 2, S310 to S320 described in conjunction with FIG. 3, S410 described in conjunction with FIG. 4, S510 to S520 described in conjunction with FIG. 5, S610 described in conjunction with FIG. 6, or S710 to S720 described in conjunction with FIG. 7, S810 to S820 described in conjunction with FIGS. 8, S910 to S920 described in conjunction with FIG. 9.

Some embodiments of the present disclosure are directed to a method for resuming a communicational connection, a base station, and a computer-readable storage medium. The method for resuming a communicational connection is applied to a target master node (MN), where the target MN is in communicational connection with a user equipment (UE), the target MN is in communicational connection with a source MN of a source site of the UE, the source site of the UE further includes a source secondary node (SN), and the source SN is in an inactive state, the method includes, sending a UE information acquisition request to the source MN, in response to a reception of a radio resource control (RRC) Resume request sent by the UE; acquiring RRC configuration information of the source SN fed back by the source MN; determining a target SN, and sending RRC configuration information to the target SN, to instruct the target SN to complete a configuration according to the RRC configuration information; and resuming a dual-connectivity communication of the UE in cooperation with the target SN with the configuration completed. According to the scheme provided by the embodiment of the present disclosure, the SN configuration efficiency of the cross-site resume procedure can be effectively improved, and the influence of the cross-site resume procedure on throughput can be reduced.

It shall be appreciated by a person having ordinary skills in the art that all or some of the steps and systems disclosed above can be implemented as software, firmware, hardware, and their appropriate combinations. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Described above is a description of some embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

What is claimed is:

1. A method for resuming a communicational connection, which is applied to a target master node (MN), wherein,
   the target MN is in a communicational connection with a user equipment (UE),
   the target MN is in a communicational connection with a source MN of the UE,
   the source MN is an MN of a source site of the UE, and
   the source site of the UE further comprises a source secondary node (SN), and
   the source SN is in an inactive state, the method comprises,
   sending a UE information acquisition request to the source MN,
   in response to a reception of a radio resource control (RRC) Resume request sent by the UE;
   acquiring RRC configuration information of the source SN fed back by the source MN;

determining a target SN, and sending the RRC configuration information to the target SN,
to instruct the target SN to complete a configuration according to the RRC configuration information; and
reporting transmission channel identification information to the mobility management functional entity (AMF);
wherein, the transmission channel identification information comprises identification information of the transmission channels of both the target MN and the target SN;
determining the transmission channel corresponding to a new transmission channel identification information as the transmission channel of the target SN,
in response to an acquisition of the new transmission channel identification information for the target SN fed back by the AMF; and
resuming a dual-connectivity communication of the UE in cooperation with the target SN with the configuration completed.

2. The method according to claim 1, wherein determining the target SN comprises,
acquiring measurement information sent by the source MN, wherein the measurement information is indicative of a transmission performance between the UE and the source SN, and the measurement information is acquired by the source SN and sent to the source MN; and
determining the target SN according to the measurement information and a preset condition.

3. The method according to claim 2, wherein determining the target SN according to the measurement information and the preset condition comprises,
determining the source SN as the target SN in response to the measurement information meeting the preset condition; or,
selecting the target SN from several available SNs according to a preset strategy and locally configured SN neighbor information, in response to the measurement information failing to meet the preset condition.

4. The method according to claim 1, wherein resuming the dual-connectivity communication of the UE in cooperation with the target SN with the configuration completed comprises,
sending RRC Resume information to the UE, in response to a reception of configuration completion information sent by the target SN, so as to instruct the UE to establish a connection with the target MN and the target SN respectively, thereby resuming the dual-connectivity communication.

5. The method according to claim 1, wherein before resuming the dual-connectivity communication of the UE in cooperation with the target SN with the configuration completed, the method further comprises,
sending a UE information release request to the source MN, to instruct the source MN to release local context information for the UE, and to trigger the source SN to release an instance for the UE.

6. A base station comprising a memory, a processor and a computer program stored in the memory and executable by the processor which, when executed by the processor causes the processor to carry out the method of claim 1.

7. The base station according to claim 6, wherein resuming the dual-connectivity communication of the UE in cooperation with the target SN with the configuration completed comprises,
sending RRC Resume information to the UE, in response to a reception of configuration completion information sent by the target SN, so as to instruct the UE to establish a connection with the target MN and the target SN respectively, thereby resuming the dual-connectivity communication.

8. A non-transitory computer-readable storage medium storing a computer-executable instruction which, when executed by a processor, causes the processor to carry out the method of claim 1.

9. The base station according to claim 6, wherein determining the target SN comprises,
acquiring measurement information sent by the source MN, wherein the measurement information is indicative of a transmission performance between the UE and the source SN, and the measurement information is acquired by the source SN and sent to the source MN; and
determining the target SN according to the measurement information and a preset condition.

10. The base station according to claim 9, wherein determining the target SN according to the measurement information and the preset condition comprises,
determining the source SN as the target SN in response to the measurement information meeting the preset condition; or,
selecting the target SN from several available SNs according to a preset strategy and locally configured SN neighbor information, in response to the measurement information failing to meet the preset condition.

11. The non-transitory computer-readable storage medium according to claim 8, wherein determining the target SN comprises,
acquiring measurement information sent by the source MN, wherein the measurement information is indicative of a transmission performance between the UE and the source SN, and the measurement information is acquired by the source SN and sent to the source MN; and
determining the target SN according to the measurement information and a preset condition.

12. The non-transitory computer-readable storage medium according to claim 11, wherein determining the target SN according to the measurement information and the preset condition comprises,
determining the source SN as the target SN in response to the measurement information meeting the preset condition; or,
selecting the target SN from several available SNs according to a preset strategy and locally configured SN neighbor information, in response to the measurement information failing to meet the preset condition.

13. The non-transitory computer-readable storage medium according to claim 8, wherein resuming the dual-connectivity communication of the UE in cooperation with the target SN with the configuration completed comprises,
sending RRC Resume information to the UE, in response to a reception of configuration completion information sent by the target SN, so as to instruct the UE to establish a connection with the target MN and the target SN respectively, thereby resuming the dual-connectivity communication.

14. The non-transitory computer-readable storage medium according to claim 8, wherein before resuming the dual-connectivity communication of the UE in cooperation with the target SN with the configuration completed, the method further comprises,
sending a UE information release request to the source MN, to instruct the source MN to release local context information for the UE, and to trigger the source SN to release an instance for the UE.

15. A method for resuming a communicational connection, which is applied to a system comprising a source master node (MN) and a target MN, wherein,
the source MN is in a communicational connection with the target MN of a user equipment (UE),
the source MN is an MN of source site of the UE, and the source site of the UE further comprises a source secondary node (SN), and
the source SN is in an inactive state, the method comprises,
acquiring, by the source MN, RRC configuration information of the source SN,
in response to a reception of a UE information acquisition request sent by a target MN;
wherein, the UE information acquisition request is sent by the target MN according to the RRC Resume request from the UE; and
sending, by the source MN, the RRC configuration information to the target MN,
to instruct the target MN to send the RRC configuration information to a determined target SN for configuration,
so as to resume a dual-connectivity communication of the UE in cooperation with the target SN with the configuration completed; wherein,
before the target MN resumes dual-connectivity communication of the UE in cooperation with the target SN with the configuration completed, the method further comprises,
reporting, by the target MN, transmission channel identification information to the mobility management functional entity (AMF);
wherein, the transmission channel identification information comprises identification information of the transmission channels of both the target MN and the target SN; and
determining, by the target MN, the transmission channel corresponding to a new transmission channel identification information as the transmission channel of the target SN,
in response to an acquisition of the new transmission channel identification information for the target SN fed back by the AMF.

16. The method according to claim 15, wherein after receiving the UE information acquisition request sent by the target MN, the method further comprises,
sending query information to the source SN, to instruct the source SN to respond to the query information and feed back measurement information that is indicative of transmission performance between the UE and the source SN; and
sending the measurement information to the target MN, to instruct the target MN to determine the target SN according to the measurement information and a preset condition.

17. The method according to claim 15, wherein after sending the RRC configuration information to the target MN, the method further comprises,
releasing local context information for the UE, in response to a reception of the UE information release request sent by the target MN; and
triggering the source SN to release an instance for the UE.

* * * * *